Fig. 1

Feb. 23, 1960  W. STICH  2,926,235
HEATING APPARATUS
Filed April 2, 1958  3 Sheets-Sheet 2

Inventor:
Wilhelm Stich
BY Michael S. Striker
Attorney

Feb. 23, 1960 W. STICH 2,926,235
HEATING APPARATUS
Filed April 2, 1958 3 Sheets-Sheet 3

Inventor:
Wilhelm Stich
By Michael S Striker
Attorney

United States Patent Office 2,926,235
Patented Feb. 23, 1960

2,926,235
HEATING APPARATUS

Wilhelm Stich, Wattenscheid-Hontrop, Germany, assignor to Firma Bochumer Verein fuer Gusstahl-Fabrikation A.G., Bochum, Germany Application April 2, 1958, Serial No. 725,998

Claims priority, application Germany October 28, 1955

15 Claims. (Cl. 219—156)

The present invention relates to a heating apparatus.

More particularly the present invention relates to an apparatus which is adapted to heat articles such as steel billets. Thus, for example, the structure of the present invention is adapted to be used in rolling mills where the billets are heated before they are rolled.

One of the objects of the present invention is to provide a heating apparatus which is capable of uniformly heating an elongated billet or the like to a temperature of from 1000° C. to 1200° C.

Another object of the present invention is to provide an apparatus capable of very rapidly heating a workpiece to the desired temperature while at the same time maintaining the reactance current losses at a low value in spite of the high current required to heat the workpiece.

A further object of the present invention is to provide a heating apparatus capable of automatically carrying out a plurality of given operations in a predetermined sequence so that each workpiece may be rapidly handled and heated and then replaced by the next following workpiece.

It is also an object of the present invention to provide a structure capable of accomplishing all of the above objects and at the same time composed of simple and ruggedly constructed parts which are very reliable in operation.

With the above objects in view the present invention includes in an apparatus for heating an electrically conductive workpiece a pair of electrodes between and in engagement with which the workpiece is adapted to be located. A means is provided for moving one of the electrodes towards the other of the electrodes so as to engage the workpiece between the electrodes, and after a predetermined pressure is applied against the workpiece by the electrodes a circuit in which the electrodes are located is automatically closed with the structure of the present invention so as to start the heating of the workpiece. These electrodes of the present invention are cooled during the heating of the workpiece, and the workpiece itself is cooled in the region of the electrodes so that instead of areas at the ends of the workpiece which are heated to a greater extent that other areas of the workpiece, the workpiece is uniformly heated along its entire length. After the workpiece has been heated to a predetermined temperature the structure of the invention operates automatically to release the workpiece and to stop the heating thereof by opening the electrical circuit in which the electrodes are located.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
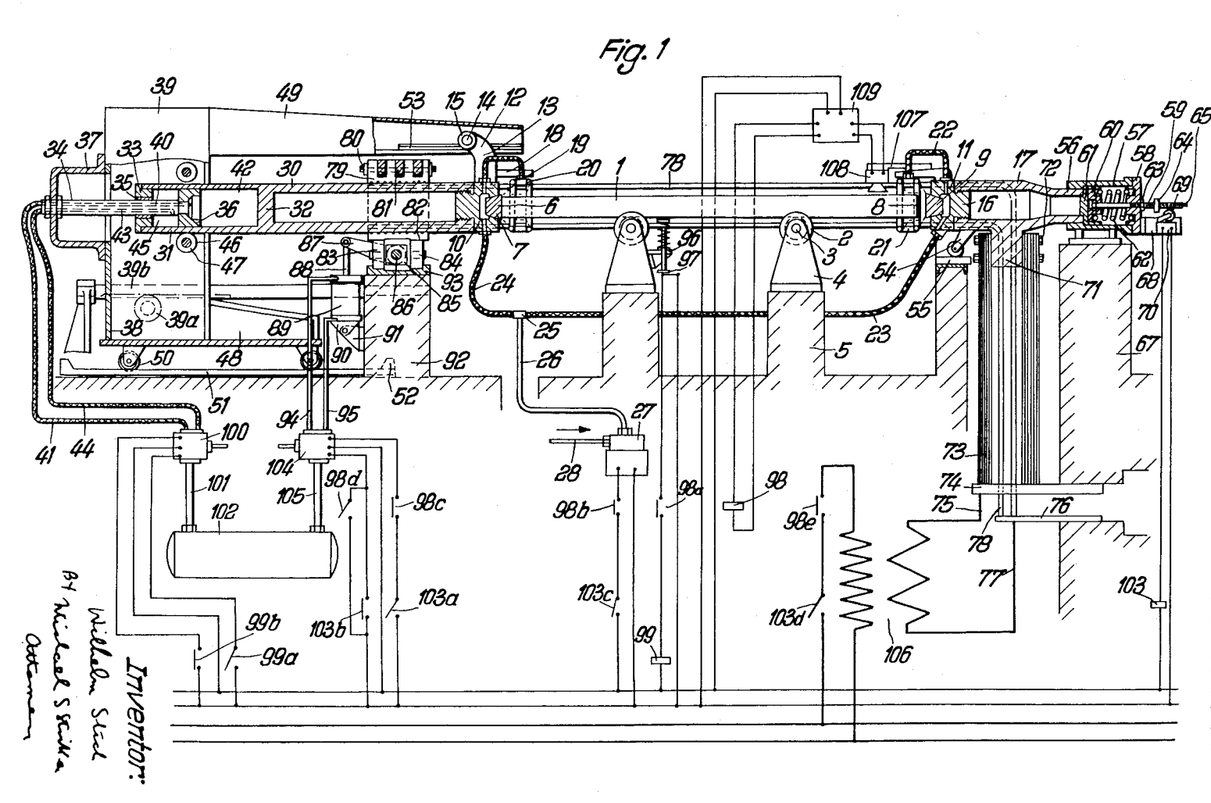
Fig. 1 is a partly sectional schematic side elevational view of one possible structure for carrying out the present invention.

Referring now to Fig. 1, the workpiece 1 is lowered by a suitable crane or the like onto a pair of rollers 2. This workpiece 1 may be, for example, an elongated billet made of steel which is to be heated by the apparatus of the invention before being rolled. The configuration of the rollers 2 corresponds to the configuration of the surface of the billet which engages the rollers so that the rollers 2 support the billet for movement to the right and left, as viewed in Fig. 1, along the axis of the billet. The rollers 2 are supported for rotation by a pair of shafts 3 which respectively extend axially through the rollers, and these shafts 3 are supported by brackets 4, respectively, which are in turn carried by the stationary base 5 of the machine.

The left end face 6 of the workpiece 1, as viewed in Fig. 1, is engaged by an electrode 7 which forms one of a pair of electrodes of the structure of the present invention. The other end face 8 of the workpiece is adapted to be engaged by the other electrode 9 which together with the electrode 7 forms the pair of electrodes of the structure of the present invention. The parts are shown in Fig. 1 in a position which they take when the end face 8 of the workpiece is still spaced from the electrode 9, and it will be noted that the electrodes 7 and 9 are spaced from each other along a predetermined axis which coincides with the axis of the workpiece which is located between the electrodes 7 and 9 to be engaged thereby.

Each of the electrodes 7 and 9 is of frustoconical configuration, and the electrode 7 is carried by a carrier 10, while the electrode 9 is carried by an electrode carrier 11. These electrode carriers are each in the form of a hollow housing, and these housings 10 and 11 are formed with open ends which are directed toward each other and which are filled by the electrodes which thus close the interiors of the housings 10 and 11, respectively. Moreover, it will be noted that each electrode has its smaller end portions extending freely into the hollow interior of the housing which carries the same.

A supporting device 12 carries the electrode carrier 10, and this supporting device 12 is in the form of a plate 13 fixed at its bottom end to the top of the housing 10 and extending upwardly therefrom. The top end of the plate 13 carries a shaft 14 which extends through and beyond the opposite side faces of the plate 13. The free ends of the shaft 14 which are located laterally beyond the opposed side faces of the plate 13 respectively carry a pair of rollers 15.

The electrode carrier 11 which carries the electrode 9 is formed at its end distant from the electrode 9 with an elongated threaded portion 16 which is threaded into the hollow end of an elongated tubular electrically conductive housing 17.

A pair of substantially L-shaped arms 18 are respectively fixed to the carriers 10 and 11 as by being bolted thereto, and these arms 18 respectively have elongated free end portions located over the space between the electrodes. Each of these free end portions of the arms 18 fixedly carries a pair of cooling liquid conduits 19 and 20, and these conduits are in the form of circular tubes which surround and are spaced from the workpiece 1. Each of the tubes 19 and 20 is formed with a plurality of openings distributed along its length, and these openings form nozzles which spray cooling liquid, such as water, in the direction indicated by the dotted line in Fig. 1. Thus, the left set of cooling tubes 19 and 20 shown in Fig. 1 direct a spray of liquid toward the electrode 7, while the right set of circular cooling conduits 19 and 20 of Fig. 1 direct the spray of cooling liquid toward the electrode 9. The cooling conduits 19 are respectively located nearer to the electrodes 7 and 9 than the cooling conduits 20, and the spray from the cooling conduits 19 directly engages the end faces of the electrodes 7 and 9 which respectively engage the ends 6 and 8 of the workpiece 1. The nozzles of the circular cooling conduits 20 direct the spray at an angle of between 30 and 50° with respect to the common axis of the electrodes 7 and 9 respectively toward these electrodes, so that the spray from the cooling tubes 20 engages the ends of the workpiece.

A conduit 21 extends between and communicates with each pair of circular cooling conduits 19 and 20, and another conduit 22 communicates with the conduit 21 and with the interior of each housing 10 and 11 through the top end thereof. A conduit 23 communicates with the interior of the housing 11 at the bottom end thereof, and a conduit 24 communicates with the interior of the housing 10 at the bottom thereof, and a T-connection 25 interconnects both of the conduits 23 and 24 with a conduit 26 to which the cooling liquid such as water is supplied from a supply conduit 28 through a magnetically operated valve 27, so that the liquid which flows along the conduit 26 branches at the connection 25 to the pair of conduits 23 and 24 so as to enter into the interior of the housings 11 and 10, respectively, from where the cooling liquid flows along the conduits 22 to the pairs of circular conduits 19 and 20 to be sprayed from the nozzles thereof.

The electrode carrier 10 is provided with a threaded portion 29 which is threaded into an elongated hollow electrically conductive bar 30 having a cylindrical exterior surface. This exterior surface of the elongated bar 30 also is smoother. At its elongated end portion which is distant from the electrode 7 the bar 30 has the form of an elongated hollow cylinder 31 which forms part of a moving means for moving the electrode 7 along the common axis of the electrodes 7 and 9. The hollow bar 30 is provided between its ends with a transverse partition 32 which forms the right end of the cylinder 31, as viewed in Fig. 1. The other end of the cylinder 31 is formed by an end wall 33 threadedly connected with the bar 30 at its left end, as viewed in Fig. 1.

A piston rod 34 extends slidably and fluid-tightly through the end wall 33 of the cylinder 31, and a suitable sealing gland 35 is provided at the end wall 33 in engagement with the piston rod 34 for providing this fluid-tight sliding engagement between the piston rod 34 and the end wall 33. This piston rod 34 fixedly carries at its right end, as viewed in Fig. 1, a piston 36 which is in slidable engagement with the inner surface of the cylinder 31. The opposite end of the piston rod 34 is fixedly connected with a bracket 37 in a form of a hood which is in turn fixedly connected with the rear wall 38 of a carriage 39. The piston rod 34 is formed with one axially extending bore 40 which serves to provide communication between a fluid conduit 41 and the inner portion 42 of the cylinder 31 which is located at the right of the piston 36, as viewed in Fig. 1, this conduit 41 being connected to the left of the piston rod 34 in communication with the bore 40 thereof, and the piston rod 34 is formed with a second bore 43 extending from the left end of the piston rod 34 to the inner portion 45 of the cylinder 31 which is located at the left of the piston 36. This bore 43 of the piston rod is connected with a conduit 44 so that the latter communicates with the inner portion 45 of the cylinder 31. The carriage 39 fixedly carries a pair of shafts 47 which turnably supports rollers 46 which engage the upper and lower surfaces of the cylinder 31 to support the latter for movement to the right and left, as viewed in Fig. 1.

The carriage 39 includes the above-mentioned rear wall 39 as well as a lower portion 48 and an upper cantilever arm 49 extending forwardly over the bar 30. The lower portion 48 of the carriage 39 is provided with rollers 50 engaging tracks 51 which cooperate with the rollers 50 to form a guide means for the carriage to guide the latter for movement in a direction parallel to the common axis of the electrodes 7 and 9. A pair of stops 52 are spaced from each other along the tracks 51 to limit the movement of the carriage 39. The carriage 39 turnably carries a pinion 39a which meshes with an elongated rack 39b extending parallel to the track 51 and supported by the base of the machine. A worm and worm wheel drive, which is not illustrated, is connected with the pinion 39a for turning the same so as to advance the carriage 39 in one direction or the other along the track 51, and because of the irreversibility of the worm and worm wheel drive the carriage 39 will remain fixed in whichever position the drive to the pinion 39a is stopped.

The elongated cantilever arm 49 of the carriage is of substantially U-shaped cross section and has a pair of side walls provided with inner surfaces which are directed toward each other, and to the inner surfaces of these side walls are fixed a pair of guide rails 53, respectively, which are located adjacent the right end of the arm 49, as shown in Fig. 1, and the rollers 15 ride on the rails 53 carried by the arm 49, so that in this way the housing 10 is supported by the carriage while being movable to the right and left, as viewed in Fig. 1, with respect to the carriage.

The elongated tubular electrically conductive housing 17 which carries the electrode carrier 11 is provided with a pair of extensions 54 respectively carrying rollers which engage a pair of rails 55 supported by the base of the machine, so that this structure serves to support the housing 17 together with the electrode carrier 11 for movement along the common axis of electrodes 7 and 9. The right free end of the housing 17, as viewed in Fig. 1, is of a reduced size as compared to the remainder of the housing 17 and is in the form of a tubular portion 56 which is slidable within a hollow cylinder 57. The right end of this cylinder 57, as viewed in Fig. 1, is closed by a cover 58 which is fixed to the cylinder 57 as by being screwed thereto, and through a central bore of the cover 58 extends an elongated rod 59. This rod 59 is in the form of an elongated bolt having its head located at the left end of the rod 59, as viewed in Fig. 1 and this head end of the bolt 59 engages a plate 60 which in turn engages the left end of a coil spring 62 located within the cylinder 57. The right end 56 of the housing 17 presses against a plate 61 which is guided for axial movement in the cylinder 57 and which engages the plate 60. The bolt 59 threadedly carries a nut 63 which presses against the exterior right face of the cover 58, as viewed in Fig. 1, and this bolt 63 serves to regulate the compression of the spring 62 when the parts are at rest. The bolt 59 extends through a considerable distance to the right beyond the nut 63, as viewed in Fig. 1, and the bolt carries at a predetermined distance from the nut 63 a switch actuating member 64. This member 64 may itself be in the form of a nut threadedly carried by the bolt so that the axial position of the nut 64 may be regulated, and any suitable lock nut, which is not shown in the drawing, may cooperate with the nut 64 to maintain the latter in a preselected position on the bolt. Furthermore, the bolt 59 is provided at its right end, as viewed in Fig. 1, with a non-circular portion 65 which may be of square cross section, for example, and which is adapted to receive a wrench, so that the bolt may be turned with respect to the nut 63 for adjusting the prestress of the spring 62. The cylinder 57 is fixedly connected with a foot member 66 which is in turn fixedly carried by the portion 67 of the base of the machine, so that the cylinder 57 remains stationary. The cover 58 of the cylinder fixedly carries a bracket 68 which supports a switch 70 provided with a roller 69 adapted to be engaged by the switch actuating member 64 for closing the switch 70 which by its own spring action remains open when the roller 69 is not engaged by the switch actuating member 64.

The elongated tubular housing 17 is provided with a downwardly directed extension 71 to which laminations of copper or the like are fixed by screws 72. These laminations form a pair of flexible groups of laminations located at opposite faces of the extension 71 and extending downwardly therefrom. The copper laminations 73 are thus electrically connected with the housing 17, and at their bottom ends distant from the housing 17 the laminations 73 are electrically connected with and supported by an electrical conductor 74 which is supported by the base portions 67 of the machine. The conductor 74 is electrically insulated from the base portions 67, so that the laminations 73 are not electrically connected with the base of the machine. This conductor 74 is in turn connected electrically with a transformer conductor 75 which is thus connected electrically with the laminations 73. A second conductor 76 is also fixed to the base of the machine while being electrically insulated therefrom, and the other portion 77 of the transformer winding, opposite from the portion 75 thereof is connected with the conductor 76. Thus, the conductors 74 and 76 are insulated from the base of the machine and are respectively connected with the ends of the right winding of the transformer shown in Fig. 1, and the conductor 74 is connected electrically only with the laminations 73 and the transformer winding portions 75. The conductor 76 in addition to being connected electrically with the end 77 of the right winding of the transformer shown on the drawing is connected electrically with a plurality of additional elongated conductors 78 which extend upwardly from the conductor 76 to substantially the elevation of the tube 17 and which then extend to the left in a direction parallel to the common axis of the electrodes 7 and 9 beyond the electrode 7, these conductors 78 being separate and spaced from each other as well as the other parts of the apparatus except for the conductor 76 and a sleeve means which surrounds and engages the bar 30 in a manner described below, this connection of the conductors 78 with the sleeve means being shown in greater detail in Fig. 2 and being described below. Thus, the conductors 78 each have one portion which extends vertically in a direction parallel to the copper lamination 73 and another portion which extends horizontally in a direction parallel to the common axis of the electrodes 7 and 9.

Figure 2:
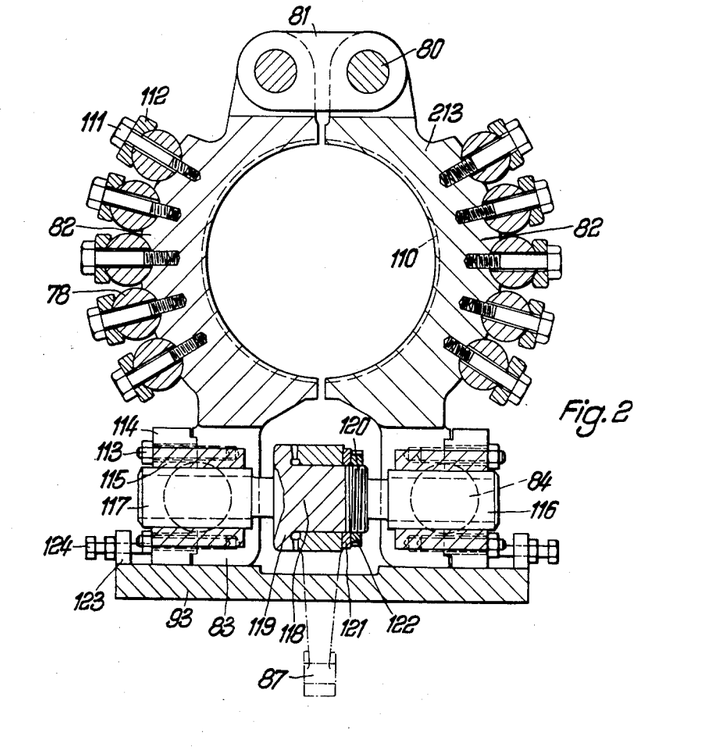
Fig. 2 is a transverse sectional view on an enlarged scale of an electrically conductive sleeve means according to the present invention which is adapted to transfer current to one of the electrodes, Fig. 2 also showing one embodiment of a means for moving sections of the sleeve means toward and away from each other.

Referring now to Figs. 1 and 2, the electrically conductive sleeve means 79 which surrounds the bar 30 is composed of a pair of semi-circular halves 82 respectively carrying at the top ends a pair of axially extending pivot pins 80, and a plurality of cross members 81 are provided and are formed with bores through which the pins 80 extend, so that in this way the sleeve halves 82 are pivotally connected to each other at their top ends for turning movement one with respect to the other. In the illustrated example three cross pieces 81 are provided in the pivotal interconnection of the sleeve halves 82 which together form the sleeve means 79 surrounding the bar 30.

These sleeve halves 82 are provided with bottom free ends 83, respectively, and each of these bottom free ends is of substantially U-shaped cross section, as is apparent from Fig. 1. The free end at the bottom of each sleeve half 82 is thus formed with a pair of downwardly extending legs, and each of these legs turnably supports a pin 84 whose axis is parallel to that of the bar 30. The pair of pins 84 carried by each sleeve half 82 are connected with a nut 85 located between the pair of bottom legs of each sleeve half, and thus there are a pair of nuts 85 respectively located at the bottom ends of the sleeve halves 82 and being substantially coaxial with respect to each other. The details of the nuts 85 are shown in Fig. 2 and described below, and these nuts are oppositely threaded and are in threaded engagement with oppositely threaded portions, respectively, of an elongated spindle which is indicated in its entirety by the reference numeral 86 in Fig. 1 and which is shown in greater detail in Fig. 2 and described in greater detail below. This spindle 86 carries a crank 87 which serves to turn the spindle for moving the halves 82 of the sleeve means 79 toward or away from each other depending upon the direction of turning of the spindle 86. The crank 87, as shown in Fig. 1, is connected with a piston rod 88 of a piston located in a cylinder 89 of a device for turning the crank 87 in one direction or the other so as to cause the sleeve means 79 to engage or to become disengaged from the bar 30.

The cylinder 89 is pivotally supported by extensions 90 thereof on a bracket 91 fixedly carried by the base portion 92 of the machine, and this base portion 92 in addition fixedly supports a guide plate 93 which cooperates with the bottom ends of the halves 82 of the sleeve means 79 to guide these bottom ends of the sleeve means for movement toward and away from each other, while the plate 93 is provided with front and rear upwardly extending flanges which prevent the sleeve means 79 from shifting axially. A pair of fluid pressure conduits 94 and 95 respectively communicate with opposite ends of the cylinder 89 for directing fluid under pressure to one or the other side of the piston in the cylinder 89 so as to turn the crank 87 in one direction or the other.

The rack 39b shown in Fig. 1 may extend through suitable openings formed in the carriage 39 so as to mesh with the pinion 39a supported by the carriage, or this pinion may be located at the exterior of the carriage supported by a side wall thereof and the rack 39b may then be located at the exterior of and alongside the carriage 39 in mesh with the pinion 39a. When the workpiece 1 is lowered into the position shown in Fig. 1 where it rests upon the rollers 2, the lower surface of the workpiece engages a spring pressed plunger of a switch 97, this plunger being guided and carried by a bracket 96. When the workpiece 1 is away from the position shown in Fig. 1 the switch 97 is open, and when the workpiece 1 is placed in the position shown in Fig. 1 the switch 97 automatically closes. The closing of the switch 97 closes the circuit of a relay 99, this circuit of the relay 99 including the normally closed switch 98a of a relay 98. The relay 99 cooperates with the normally closed switch 99b and the normally open switch 99a of this relay. Thus, when the relay 99 is energized the switch 99a closes and the switch 99b opens, and in this way the solenoid of the valve 100 is energized so as to place the flexible conduit 41 in communication with the conduit 101 which leads from a container 102. This container 102 contains compressed air. Therefore, the compressed air at this time, flows from the container 102 through the conduit 101, the valve 100, the conduit 41, and bore 40 of the piston rod 34 into the chamber 42 of the cylinder 31. Therefore, the compressed air in the chamber 42 will move the cylinder 31 together with the remainder of the bar 30 to the right, as viewed in Fig. 1, and this will cause the electrode 7 to engage the end face 6 of the workpiece 1, this workpiece 1 now advancing to the right together with the electrode 7 beyond the position of the workpiece 1 shown in Fig. 1 so that the end face 8 will engage the electrode 9. The parts are shown in Fig. 1 in the position they take just before the end face 8 engages the electrode 9. After the workpiece has engaged the electrode 9, the continued movement of the moving means constituted by the cylinder 31 together with the remainder of the bar 30 is against the resistance provided by the spring 62. Therefore, as the parts continue to advance to the right, as viewed in Fig. 1, the force required to advance the parts to the right continuously increases after the workpiece has engaged the electrode 9, because the spring 62 is being continually compressed to an increasing extent.

These operations continue until the switch actuating member 64 engages the roller 69 to close the switch 70. The position of the switch actuating member 64 will be determined by the length and cross section of the workpiece. Thus, the operator takes the dimensions of the workpiece into consideration when setting the switch actuating member 64, and the main consideration is that the pressure applied by the electrodes to the ends of the workpiece, respectively, when the switch 70 is closed should not be great enough to cause any bending of the workpiece when it is heated to the desired temperature.

The automatic closing of the switch 70 in this way serves to close the circuit of a relay 103, this relay including the normally closed switch 103b and the normally open switches 103a, 103c and 103d. Thus, when the relay 103 is energized by closing of the switch 70 the switch 103b will be opened and the switch 103a will be closed. This results in energizing of the solenoid of the valve 104 to actuate the valve in a manner which places the conduit 94 in communication with the conduit 105 leading from the compressed air tank 102. As a result compressed air is delivered by the conduit 94 into the top end of the cylinder 89 so as to move the piston rod 88 downwardly and turn the crank 87 in a counter-clockwise direction, as viewed in Fig. 1. The threads of the spindle 86 are wound in such a direction that when the crank 87 is turned in a counter-clockwise direction in this manner the halves 82 of the sleeve means 89 will be drawn toward each other so as to tightly press against the exterior surface of the bar 30. In this way not only is an electrical connection established between the sleeve means 79 and the bar 30, but in addition the sleeve means 79 which is prevented from shifting axially cooperates with the bar 30 to act as a brake for preventing the further advancing of the bar 30 to the right, as viewed in Fig. 1, so that the energizing of the relay 103 upon closing of the switch 70 in the manner described above serves to limit the pressure with which the electrodes 7 and 9 respectively engage the end faces 6 and 8 of the workpiece 1.

At the same time that the energizing of the relay 103 causes the switch 103a to close, the switches 103c and 103d also close. The closing of the switch 103c completes a circuit to the solenoid of the valve 27 so as to open this valve, and as a result the cooling water now flows from the supply conduit 28 along the conduit 26 to the interiors of the housings 10 and 11 and to the spray nozzles in the manner described above.

The closing of the switch 103d closes the circuit of the left coil of the transformer 106 shown in Fig. 1, and as a result the transformer now operates to complete the circuit and supply the heating current to the workpiece through the electrodes 6 and 9. The current flows from the end 75 of the secondary winding of the transformer through conductor 74 and copper laminations 73 to the housing 17 and from the latter through the electrode carrier 11 to the electrode 9. From the electrode 9 the current flows through the workpiece 1 to the electrode 6, and from the electrode 6 the current flows through the electrode carrier 10 and bar 30 to the sleeve means 79 from where the current flows to the plurality of conductors 78 back to the conductor 76 and the end 77 of the secondary winding of the transformer. All of these current carrying parts starting with elements 74 and 76 and ending with the sleeve means 79 are arranged parallel to each other and at relatively small distances from each other, so that in this way the structure of the invention maintains the reactance current losses at relatively low values. During the heating of the workpiece the cooling water flows through the electrode carriers to the spray nozzles to cool the ends of the workpiece as well as the electrodes themselves in the manner described above. As a result of the cooling of the ends of the workpiece the heat generated by the relatively high resistance where the end faces of the workpiece are in engagement with the electrodes is maintained at a value which is substantially the same as the temperature of the workpiece along its entire length, so that in this way substantially uniform heating of the entire workpiece throughout its length is provided.

Adjacent to the electrode 9 is located a stationary arm 107 which supports a pyrometer 108, this pyrometer being positioned in such a way that it does not interfere with the movement of the workpiece to and from its position between the electrodes. The pyrometer 108 senses the temperature to which the workpiece is heated, and this pyrometer is connected electrically with an amplifier 109 and through the latter with a relay 98. When the workpiece reaches a temperature of 1100° C., for example, assuming that the pyrometer is set for this temperature, then the pyrometer will act through the amplifier 109 to cause contacts of the amplifier 109 to energize the relay 98. This relay 98 includes the normally closed switches 98b and 98c as well as the normally closed switch 98a, and this relay also includes the normally open switch 98d. Thus, the energizing of the relay 98 will cause the switch 98a to open so as to deenergize the relay 99. As a result the switch 99a opens and the switch 99b closes, and the valve 100 is now actuated so as to direct the compressed air from the tank 102 along the conduit 44 and the bore 43 of the piston rod 34 into the chamber 45 of the cylinder 31. Thus, at this time the direction of movement of the reversible moving means formed in part by the cylinder 31 is reversed to cause the bar 30 together with the electrode 7 to be moved to the left, as viewed in Fig. 1. Of course, such movement of the electrode 7 cannot take place until the bar 30 is released by the sleeve means 79. At the same time that the relay 98 opens the switch 98a, this relay 98 also opens the switch 98c and closes the switch 98d so as to actuate the valve 104 to introduce compressed air into the cylinder 89 through the conduit 95 which causes the crank 87 to be turned in a clockwise direction, as viewed in Fig. 1, for moving the sections of the sleeve means away from each other so as to release the bar 30, and therefore this bar 30 is free to move to the left under the influence of the compressed air in the chamber 45. This reverse movement of the parts causes the spring 62 to expand so that the switch actuating member 64 moves to the left, as viewed in Fig. 1, away from the switch, 70, and the latter automatically opens so as to energize the relay 103. As a result the switch 103d opens and the heating of the workpiece stops.

When the bar 30 has been moved in this manner through a sufficient distance to the left, as viewed in Fig. 1, the workpiece 1 can be shifted to the left and raised away from the rollers 2 and from the structure of the invention, so that the switch 97 opens and the pyrometer 108 ceases to act on the relay 98. The parts are now again in their rest position and the above operations can be repeated with the next workpiece.

Referring now to Fig. 2, each of the sections 82 of the sleeve means 79 is provided at its inner surface which engages the bar 30 with a plurality of grooves 110 which are circular and extend about the axis of the sleeve means. As a result of these grooves, when the sleeve means clamps the bar 30, the lubricant on the latter can enter into the grooves and the relatively small metallic areas between the grooves 110 at the inner surface of the sleeve means 79 can penetrate through the lubricant into direct metal to metal contact with the exterior surface of the bar 30, so that in this way the resistance at the connection between the sleeve means and the bar 30 is greatly reduced. As a result, the sleeve means 79 does not become heated to any appreciable extent.

In the construction illustrated in Fig. 2, each section 82 of the sleeve means has fixedly connected thereto five closely spaced conductors 78. These conductors are fixed to the sleeve sections by bolts 111 which press washers 112 against the conductors, these washers 112 having at their faces which engage the conductors concave recesses into which the conductors fit, as shown in Fig. 2. Moreover, it will be noted that the exterior surfaces of the sections 82 are formed with recesses into which the conductors 78 extend, so that there is a considerable area of contact between the conductors and the sleeve means 79, and in this way the resistance at the connection between the conductors 78 and the sleeve means 79 also is maintained at a relatively low value. It will be noted from Fig. 2 that the conductors 78 are arranged in two groups on both sides of the axis of the sleeve means 79, so that these conductors which extend parallel to the axis of the workpiece are arranged in two groups of the workpiece on opposite sides thereof in a manner which provides sufficient room for the workpiece to be moved without any inconvenience up or down to or from the machine.

As may also be seen from Fig. 2, screws 113 fixed to the lower ends 83 of the sleeve sections 82 retain shell members 114 which cooperate with the lower free ends 83 to form bearings for the elongated pins 84, one pair of these pins being coaxially carried by each of the sleeve sections 82, as described above. The nut 85 referred to above is shown at 115 in Fig. 2. Thus, each pair of coaxial pins 84 is fixedly connected with a nut 115. These nuts 115 cooperate threadedly with the threaded end portions 116 and 117 of a one-piece spindle 118 which extends between the lower free ends 83 of the sleeve sections 82. The threaded portion 116 of the spindle may have a right hand thread and the threaded portion 117 may have a left hand thread, or the reverse may be provided. The crank 87 has a circular end portion through which the spindle 118 extends, and this crank is turnable with respect to the spindle 118 until the crank is placed in driving engagement with the spindle 118 in a manner now to be described. The intermediate portion of the spindle 118 which extends through the circular end of the crank 87 is provided with an annular flange 119 having a toothed face directed toward the circular end of the crank 87. This circular end of the crank 87 also has a toothed face directed toward the toothed face of the flange 119. Thus, when the teeth of the flange 119 mesh with the teeth of the crank 87, the parts are in driving engagement with each other and the turning of the crank 87 will be transmitted to the spindle 118. The spindle 118 carries a washer 121 in engagement with the circular end portion of the crank 87, and the intermediate portion of the spindle 118 is provided with a threaded surface receiving a nut 122 which may be tightened so as to place the crank 87 in driving engagement with the spindle 118 and so as to maintain the crank 87 in such driving engagement with the spindle 118.

At its opposite sides the guide plate 93 is provided with threaded eyes 123 through which screw members 124 threadedly extend. The axial positions of these screw members may be adjusted so that their free ends cooperate with the lower free ends 83 of the sleeve sections 82. Thus, the screw members 124 are adjustable stops which can be set to limit the extent of turning movement of the sections 82 of the sleeve means 79. If one of the ends 83 of the section 82 engages the pins 124, then the particular section can turn no further and a continued turning of the spindle 118 will guarantee that the other section of the sleeve moves away from the bar 30 until the bottom free end portion 83 of this other sleeve section engages the other stop 124. In this way it cannot happen that one of the sleeve sections 82 remains in engagement with bar 30 while the other sleeve section moves away from the latter to an undesirably large extent.

Figure 3:
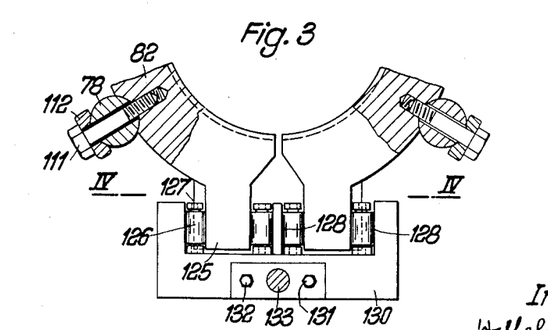
Fig. 3 is a fragmentary partly sectional end view of another embodiment of a means for moving the sections of the sleeve means of Fig. 2 toward and away from each other.
Figure 4:
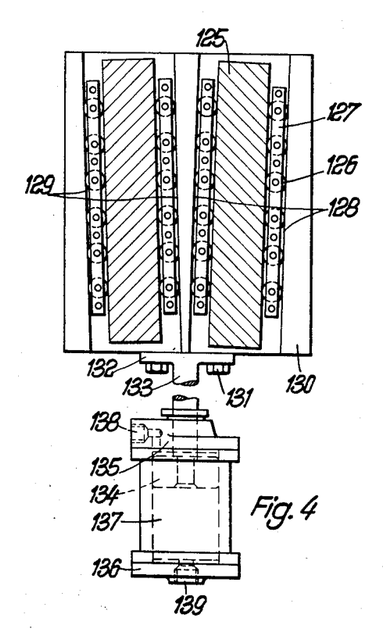
Fig. 4 is a plan view of the structure of Fig. 3 taken along the line IV—IV of Fig. 3.

Instead of interconnecting the sleeve sections through pivot pins 80 and cross pieces 81, the top ends of the sleeve sections may be provided respectively with knob-like bosses which extend into a hollow hood-like member which interconnects these knob-like projections for turning movement with respect to each other, so that in this way the sections may be connected together without the use of elements such as pivot pins 80. The movement of the sections 82 of the sleeve means 79 toward and away from each other may also be brought about with the structure shown in Figs. 3 and 4 instead of the structure shown in Figs. 1 and 2. In this embodiment the lower ends of the sections 82 are in the form of elongated members 125 which are inclined with respect to each other in the manner shown most clearly in Fig. 4. Each of these free ends 125 of each sleeve section is located between a pair of parallel sets of rollers 126. Each row of rollers 126 is carried by a cage 127, and the cages 127 are carried by a member 130 which takes the place of the member 93 of the embodiment of Figs. 1 and 2. The surfaces 128 and 129 of member 130 along which the rows of rollers 126 are arranged have the same inclination as the elongated lower end portions 125 of the sleeve sections 82, respectively.

The member 130 is moved in one or the other direction by a piston rod 133 which has its flange 132 fixed to one end of the member 130 by the screws 131. This piston rod 133 is fixed to a piston 134 located within a stationary cylinder 137 having end walls 135 and 136. The end wall 135 is formed with a passage 138 leading into the interior of the cylinder and this passage 138 is connected with the conduit 94 shown in Fig. 1, while the end wall 135 is formed with a passage 139 also leading to the interior of the cylinder, and this passage 139 is connected with the conduit 95 of Fig. 1. Therefore, when the valve 104 is actuated in the manner described above the piston rod 133 will be moved in one direction or the other so as to shift the member 130 in the direction of the axis of the sleeve means for opening or closing the latter, and any suitable stop members engage opposite ends of the sleeve means to prevent axial shifting thereof during the axial shifting of the member 130, so that in this way the sections 82 are moved toward or away from each other with the embodiments of Figs. 3 and 4.

Inasmuch as the sheared end faces of the workpiece 1 do not necessarily extend perpendicularly to the axis of the workpiece, the electrode carrier structure shown in Fig. 1 is to be considered as schematic. The details of a suitable electrode carrier structure which enables the electrodes to adapt themselves to the inclinations of the end faces of the workpiece is illustrated in Figs. 5 and 6.

Figure 5:
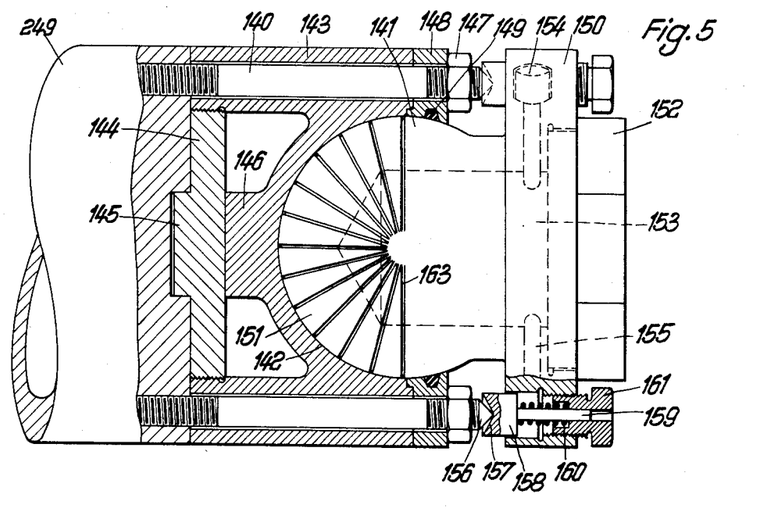
Fig. 5 is a fragmentary partly sectional view illustrating the details of the structure of the present invention for supporting an electrode.
Figure 6:
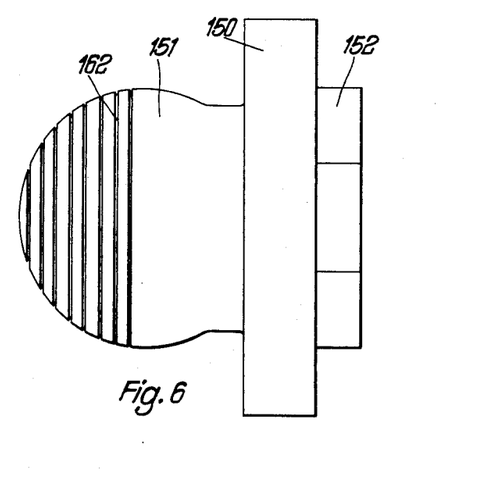
Fig. 6 illustrates a variation of part of the structure of Fig. 5.

Thus, referring to Fig. 5, it will be seen that the elongated hollow bar 30 is threadedly connected with a plurality of elongated studs 140 which extend to the right, as viewed in Fig. 5, beyond the right end face of the bar 30, and these studs 140 extend respectively through axial bores of a socket member 142 of a ball and socket joint shown in Fig. 5. The ball member 141 of the ball and socket joint is shown within the socket member 142. This member 142 forms part of a cast electrically conductive housing 143 which threadedly carries at its left end, as viewed in Fig. 5, an electrically conductive member 144 which increases the area of contact between the bar 30 and the electrode carrying structure. The member 144 is formed with a central pin 145 which extends into a mating recess in the right end face of the bar 30, and the right surface of the plate 144, as viewed in Fig. 5, presses against a rearwardly directed extension 146 of the socket member 142. The studs 140 threadedly carry a plurality of nuts 147 which serve to press against the right annular surface of the socket housing 143 a securing ring 148 which secures the ball member 141 within the socket member 142, and this ring 148 is provided with an annular felt ring 149 which engages the exterior surface of the ball member 141. This ring 149 acts as a sealing ring to retain lubricant within the ball and socket joint.

The electrode carrier itself includes an annular flange 150 fixedly connected with the ball member 141, and the electrode carrier has a cylindrical portion between the spherical portion 141 and the flange 150. This flange 150 is formed with a bore leading into the hollow interior 153 of the electrode carrier, and the electrode 152 is threadedly connected with the flange 150 so as to close the opening thereof. The electrode 152 is preferably of hexagonal configuration so that it can be tightened and loosened by applying a wrench to the electrode 152. The flange 150 is formed with a pair of bores 154 and 155 leading into the hollow interior 153 of the electrode carrier, and these bores 154 and 155 are threaded at their outer ends so as to receive nipples for connecting with these bores the cooling water conduits which operate in the manner described above.

With this ball and socket type of support for the electrode, the electrode is capable of adapting itself to the inclination of the end face of the workpiece, and a means is provided for releasably retaining the electrode in a position where it is perpendicular to the axis of bar 30 when the electrode is not in engagement with the workpiece. This means includes the ends 156 of the studs 140, these ends 156 being rounded and of a substantially dome-shaped configuration. These ends 156 respectively extend into recesses 157 of a plurality of pins 158 which are slidable within axial bores of the flange 150, respectively. Each of the pins 158 has an elongated portion 159 of reduced cross section which extends slidably into the axial bore of a member 161 which is threadedly carried by the bore of the flange 150 which slidably receives the larger portion of each pin 158, and a coil spring 160 is coiled about the portion 159 of each pin and presses at one end against the member 161 and at its opposite end against the annular surface of each pin 158 which is located between the larger and smaller portions thereof. The free right ends of the members 160 are of hexagonal configuration so that these members 160 may be conveniently turned by the screw or the like. The springs 160 act to return the electrodes to a predetermined position with respect to the axis of the bar 30 whenever these electrodes do not press against the end face of the workpiece. Moreover, the screw members 161 are set to prestress the springs 160 so as to compensate for the weight of the electrode and its carrier structure. Thus, the lower member 160 will be turned so as to compress the lower spring 160 to a greater extent than the upper spring, and in this way this lower spring is able to take care of the weight of the electrode and its carrier which would tend to turn the electrode downwardly through a predetermined angle if both the upper and the lower springs were prestressed to the same extent. Moreover, the ends 156 of the studs 140 cooperate with the recesses 157 to prevent turning of the electrode and its carrier structure about the axis of the bar 30.

The exterior surface 151 of the ball member 141 is provided with a relatively large number of grooves. These grooves are provided for the same reason as the grooves 110 of the sleeve means 79. Thus, lubricant may accumulate in and be stored in these grooves.

In the arrangement shown in Fig. 6 the grooves 162 are of circular configuration and are all parallel to each other. It is of particular advantage, however, to arrange the grooves as shown for the grooves 163 in Fig. 5. Thus these grooves radiate along meridians from a pair of opposed areas similar to opposite poles of the spherical member 141. With the arrangement shown in Fig. 5 it is possible to use the pole areas at which the ends of all of the grooves are located for the purpose of transmitting a lubricating oil to or from the surfaces of the ball and socket joint, the lubricating oil acting as a cooling liquid in this case.

It will be understood that each of the elements described above, or two or more together, may also find a useful application in other types of heating apparatus differing from the types described above.

While the invention has been illustrated and described as embodied in electrical heating apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

This application is a continuation-in-part of my application Serial No. 615,381, filed October 11, 1956, and now abandoned.

What is claimed as new and desired to be secured by Letters Patent is:

1. A heating apparatus for heating an electrically conductive workpiece, comprising, in combination, first and second electrodes spaced from each other along a predetermined axis and adapted to have a workpiece located between and in engagement with said electrodes; moving means cooperating with said first electrode for moving the same along said axis toward said second electrode so that said electrodes press against a workpiece located between and in engagement with said electrodes; means cooperating with said second electrode for yieldably resisting movement of the latter along said axis away from said first electrode, so that said moving means cooperates with said first electrode to move the latter, a workpiece between and in engagement with said electrodes, and said second electrode along said axis against the force of said means yieldably resisting movement of said second electrode; an electrical circuit in which said electrodes are located; electrically conductive brake means forming part of said circuit and movable between an inactive position and an active position in which said brake means engages and prevents movement of said first electrode in direction of said axis; a switch forming part of said circuit for closing the same when said switch is closed; and means connected with one of said electrodes for movement therewith along said axis into engagement with said switch for closing the same and for moving said brake means from the inactive to the active position thereof when said second electrode has moved through a predetermined distance along said axis.

2. In an apparatus for heating an electrically conductive workpiece, in combination, an electrically conductive electrode carrier having at one face a means for releasably connecting an electrode with said carrier; an electrically conductive spherical member fixedly connected with said carrier at a face opposite from said one face thereof; and an electrically conductive member formed with a spherical recess in which said spherical member is located in engagement with said member formed with said recess, the latter member having a surface engaging an exterior surface of said spherical member, and at least one of said surfaces being formed with a plurality of grooves.

3. In an apparatus for heating an electrically conductive workpiece, in combination, an electrically conductive electrode carrier having at one face a means for releasably connecting an electrode with said carrier; an electrically conductive spherical member fixedly connected with said carrier at a face opposite from said one face thereof; and an electrically conductive member formed with a spherical recess in which said spherical member is located in engagement with said member formed with said recess, the latter member having a surface engaging an exterior surface of said spherical member, and at least one of said surfaces being formed with a plurality of grooves, said grooves radiating from a given area of said one surface.

4. In an apparatus for heating an electrically conductive workpiece, in combination, an electrode carrier; an electrode removably carried by said carrier; ball and socket means supporting said carrier for turning movement in all directions; and spring means cooperating with said ball and socket means and with said carrier for yieldably holding the latter in a predetermined position.

5. In a heating apparatus, in combination, an internally cooled electrode; support means supporting said electrode for engagement at one face thereof with a workpiece; and a conduit for cooling liquid located adjacent to said electrode and formed with nozzles directed toward said face of said electrode so that cooling liquid in the conduit is directed therefrom to said face of said electrode for cooling the latter.

6. In an apparatus for heating an electrically conductive workpiece, in combination, an electrode; support means supporting said electrode for engagement at one face thereof with a workpiece; a pair of cooling liquid conduits located adjacent said electrode, one of said conduits being located nearer to said electrode than the other of said conduits and said one conduit being formed with nozzles directed toward said electrode for directing cooling liquid from said one conduit to said face of said electrode, the other of said conduits being formed with nozzles which direct cooling liquid toward said electrode at an angle of between 30° and 50° with respect to an axis substantially perpendicular to said face of said electrode.

7. In an apparatus for heating an electrically conductive workpiece, in combination, an electrode for engaging the workpiece to be heated; an elongated cylindrical bar operatively connected with said electrode for supporting the same and extending therefrom, said bar being electrically conductive; moving means operatively connected to said bar for moving the same in longitudinal direction; electrically conductive stationary sleeve means surrounding and engaging said bar for establishing an electrical connection therewith, said sleeve means including a pair of semi-circular sleeve halves turnably connected to each other at one of their ends and having a pair of opposed free ends located adjacent each other, said sleeve halves being formed at the inner surfaces thereof with a plurality of closely spaced grooves adapted to contain a lubricant; and additional moving means cooperating with said free ends of said halves of said sleeve means for moving said halves of said sleeve means toward each other into engagement with said bar and away from each other out of engagement with said bar.

8. In an apparatus for heating an electrically conductive workpiece, in combination, an electrode for engaging the workpiece to be heated; an elongated cylindrical bar operatively connected with said electrode for supporting the same and extending therefrom, said bar being electrically conductive; moving means operatively connected to said bar for moving the same in longitudinal direction; electrically conductive stationary sleeve means surrounding and engaging said bar for establishing an electrical connection therewith, said sleeve means including a pair of semi-circular sleeve halves turnably connected to each other at one of their ends and having a pair of opposed free ends located adjacent each other, said sleeve halves being formed at the inner surfaces thereof with a plurality of closely spaced grooves adapted to contain a lubricant; and additional moving means cooperating with said free ends of said halves of said sleeve means for moving said halves of said sleeve means toward each other into engagement with said bar and away from each other out of engagement with said bar, said moving means being in a form of a wedge means axially shiftable with respect to said sleeve means for moving said halves thereof toward each other when said wedge means moves in one direction and for moving said halves of said sleeve means away from each other when said wedge means moves in an opposite direction parallel to the axis of said bar.

9. In an apparatus for heating an electrically conductive workpiece, in combination, an electrode, for engaging the workpiece to be heated; an elongated cylindrical bar operatively connected with said electrode for supporting the same and extending therefrom, said bar being electrically conductive; electrically conductive sleeve means surrounding and engaging said bar for establishing an electrical connection therewith, said sleeve means including a pair of semi-circular sleeve halves turnably connected to each other at one of their ends and having a pair of opposed free ends located adjacent each other; and moving means cooperating with said free ends of said halves of said sleeve means for moving said halves of said sleeve means toward each other into engagement with said bar and away from each other out of engagement with said bar, said moving means being in a form of a wedge means axially shiftable with respect to said sleeve means for moving said halves thereof toward each other when said wedge means moves in one direction and for moving said halves of said sleeve means away from each other when said wedge means moves in an opposite direction parallel to the axis of said bar, said free ends of said halves of said sleeve means being inclined one with respect to the other and converging toward each other from one end toward the opposite end of each of said free ends of said halves of said sleeve means and said wedge means including a plurality of rollers engaging said free ends of said sleeve means.

10. In an apparatus for heating an electrically conductive workpiece, in combination, an electrode for engaging the workpiece to be heated; an elongated cylindrical bar operatively connected with said electrode for supporting the same and extending therefrom, said bar being electrically conductive; electrically conductive sleeve means surrounding and engaging said bar for establishing an electrical connection therewith, said sleeve means including a pair of semi-circular sleeve halves turnably connected to each other at one of their ends and having a pair of opposed free ends located adjacent each other; and moving means cooperating with said free ends of said halves of said sleeve means for moving said halves of said sleeve means toward each other into engagement with said bar and away from each other out of engagement with said bar, said moving means being in a form of a pair of oppositely threaded spindles threadedly connected with said free ends of said halves of said sleeve means, respectively, and means cooperating with said spindles for turning the same in one direction to move said halves of said sleeve means toward each other and in an opposite direction for moving said halves of said sleeve means away from each other.

11. In an apparatus for heating an electrically conductive workpiece, in combination, an electrode for engaging the workpiece to be heated; an elongated cylindrical bar operatively connected with said electrode for supporting the same and extending therefrom, said bar being electrically conductive; electrically conductive sleeve means surrounding and engaging said bar for establishing an electrical connection therewith, said sleeve means including a pair of semi-circular sleeve halves turnably connected to each other at one of their ends and having a pair of opposed free ends located adjacent each other;

and moving means cooperating with said free ends of said halves of said sleeve means for moving said halves of said sleeve means toward each other into engagement with said bar and away from each other out of engagement with said bar, said moving means being in a form of an elongated spindle extending between said free ends of said halves of said sleeve means and having a pair of oppositely threaded portions in threaded engagement with said free ends of said halves of said sleeve means, said spindle being provided between said free ends of said halves of said sleeve means with an annular flange one face of which is toothed, and said moving means including a crank having a circular portion through which a part of said spindle located between said free ends of said halves of said sleeve means extends, and said circular portion of said crank having in engagement with said toothed face of said flange an annular toothed surface, so that said crank meshes with said flange to transmit turning movement to said spindle when said crank is turned.

12. In an apparatus for heating an electrically conductive workpiece, in combination, a pair of electrodes spaced from each other and located along a predetermined axis and adapted to engage a workpiece located between said electrodes; an elongated electrically conductive bar extending along said axis and operatively connected with one of said electrodes for supporting the same; an electrically conductive sleeve surrounding and engaging said bar for establishing an electrical connection therewith; a plurality of elongated electrical conductors fixed to said sleeve and extending therefrom in a direction parallel to said axis up to the region of the other of said electrodes and then extending beyond said other electrode; and a transformer connected electrically with said conductors.

13. In an apparatus for heating an electrically conductive workpiece, in combination, a pair of electrodes spaced from each other and located along a predetermined axis and adapted to engage a workpiece located between said electrodes; an elongated electrically conductive bar extending along said axis and operatively connected with one of said electrodes for supporting the same; an electrically conductive sleeve surrounding and engaging said bar for establishing an electrical connection therewith; a plurality of elongated electrical conductors fixed to said sleeve and extending therefrom in a direction parallel to said axis up to the region of the other of said electrodes and then extending beyond said other electrode; and a transformer connected electrically with said conductors, said conductors being arranged in two groups respectively located on opposite sides of said axis.

14. In an apparatus for heating an electrically conductive workpiece, in combination, an electrode adapted to engage the workpiece; an elongated bar operatively connected with said electrode for supporting the same and extending therefrom; a carriage carrying said bar; guide means guiding said carriage for movement in a direction parallel to said bar; and means for releasably holding said carriage in a selected position along its path of movement.

15. In an apparatus for heating an electrically conductive workpiece, in combination, a pair of electrodes spaced from each other and located along a predetermined axis and adapted to engage a workpiece located between said electrodes; an elongated electrically conductive bar extending along said axis and operatively connected with one of said electrodes for supporting the same; moving means connected to said bar for moving the same in longitudinal direction toward and away from the other of said electrodes for pressing the workpiece during its movement towards said other electrode with increasing pressure against said other electrode; pressure indicating means for indicating the pressure exerted on the workpiece; electrically conductive sleeve means surrounding said bar and including a pair of semi-circular sleeve halves turnably connected to each other at one of their ends and having a pair of opposed free ends located adjacent each other, said sleeve halves being movable between an active position in which said sleeve halves tightly clamp said bar for establishing electrical connections therewith and for preventing relative movement between said bar and said sleeve halves and an inactive position in which said sleeve halves are disengaged from said bar; means mounting said sleeve means against movement in direction of said axis; and moving means operatively connected to said pressure indicating means and cooperating with said free ends of said sleeve halves for moving the same from said inactive to said active positions thereof when said pressure indicating means indicates a predetermined pressure.

References Cited in the file of this patent

UNITED STATES PATENTS

| | | |
|---|---|---|
| 935,346 | Winfield | Sept. 28, 1909 |
| 1,938,994 | Benedetto | Dec. 12, 1933 |
| 1,979,111 | Kalschne | Oct. 30, 1934 |
| 2,233,617 | Lamb | Mar. 4, 1941 |
| 2,248,280 | Nobiron | July 8, 1941 |
| 2,457,606 | Senn | Dec. 28, 1948 |
| 2,504,790 | Barlow | Apr. 18, 1950 |
| 2,636,066 | Sciaky | Apr. 21, 1953 |
| 2,673,333 | Seeloff et al. | Mar. 23, 1954 |